(12) United States Patent
Roberts et al.

(10) Patent No.: US 12,606,917 B2
(45) Date of Patent: Apr. 21, 2026

(54) METHOD AND APPARATUS FOR USING NANOGALVANIC ALLOYS TO PRODUCE HYDROGEN

(71) Applicant: U.S. Army DEVCOM Army Research Laboratory, Adelphi, MD (US)

(72) Inventors: Anthony J. Roberts, Chesapeake City, MD (US); Anit K. Giri, Abingdon, MD (US); Billy C. Hornbuckle, Bel Air, MD (US); Kristopher A. Darling, Havre de Grace, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 177 days.

(21) Appl. No.: 17/682,501

(22) Filed: Feb. 28, 2022

(65) Prior Publication Data

US 2023/0272539 A1 Aug. 31, 2023

(51) Int. Cl.
*C25B 1/042* (2021.01)
*C01B 3/10* (2006.01)
*C25B 11/046* (2021.01)

(52) U.S. Cl.
CPC ................. *C25B 1/042* (2021.01); *C01B 3/10* (2013.01); *C25B 11/046* (2021.01)

(58) Field of Classification Search
CPC ......... C25B 1/042; C25B 11/046; C25B 1/04; C25B 1/50; C25B 11/042; C25B 5/00; C01B 3/10; Y02E 60/36
See application file for complete search history.

(56) References Cited

U.S. PATENT DOCUMENTS

| | | | | |
|---|---|---|---|---|
| 4,200,460 | A | * | 4/1980 | Grossman ................ G21C 3/17 |
| | | | | 376/418 |
| 5,494,538 | A | | 2/1996 | Kirillov et al. |
| 5,510,201 | A | * | 4/1996 | Werth ...................... B60K 1/04 |
| | | | | 429/421 |
| 6,726,892 | B1 | | 4/2004 | Au |
| 7,441,717 | B1 | | 10/2008 | Majka et al. |
| 7,837,976 | B2 | | 11/2010 | Sandrock et al. |
| 7,938,879 | B2 | | 5/2011 | Woodall et al. |
| 8,080,233 | B2 | | 12/2011 | Woodall et al. |

(Continued)

FOREIGN PATENT DOCUMENTS

| | | |
|---|---|---|
| CN | 101289163 A | 10/2008 |
| CN | 101798061 A | 8/2010 |

(Continued)

OTHER PUBLICATIONS

F. Zhang et al. "Hydrogen generation from pure water using Al—Sn powders consolidated through high-pressure torsion", J. Mater. Res., vol. 31, No. 6, Mar. 28, 2016 (Year: 2016).*

(Continued)

*Primary Examiner* — Anthony J Zimmer
*Assistant Examiner* — Syed T Iqbal
(74) *Attorney, Agent, or Firm* — Christos S. Kyriakou

(57) ABSTRACT

A method and apparatus for generating hydrogen gas by reacting a nanogalvanic alloy with water vapor. The apparatus comprises a water vapor source for supplying water vapor to a reaction chamber containing a nanogalvanic alloy. The nanogalvanic alloy reacts with the water vapor to produce hydrogen.

7 Claims, 2 Drawing Sheets

(56) References Cited

U.S. PATENT DOCUMENTS

| | | | |
|---|---|---|---|
| 9,011,572 | B1 | 4/2015 | Bunker et al. |
| 9,061,261 | B2 | 6/2015 | Fullerton |
| 9,561,538 | B2 | 2/2017 | Yousefiani |
| 10,384,937 | B2 | 8/2019 | Bunker et al. |
| 2002/0048548 | A1 | 4/2002 | Chaklader |
| 2007/0199410 | A1 | 8/2007 | Scholl |
| 2013/0181175 | A1 | 7/2013 | Lu |
| 2013/0299185 | A1 | 11/2013 | Xu et al. |
| 2015/0360941 | A1 | 12/2015 | Macrae |
| 2016/0059214 | A1 | 3/2016 | Helton |
| 2020/0024689 | A1* | 1/2020 | Giri ........................... C25B 9/40 |
| 2020/0189911 | A1 | 6/2020 | Koehler et al. |

FOREIGN PATENT DOCUMENTS

| | | |
|---|---|---|
| CN | 102009950 A | 4/2011 |
| EP | 0288663 | 11/1988 |

OTHER PUBLICATIONS

Decision issued on Mar. 18, 2022 in related Chinese Application No. 201880054750.3.

Examination Report issued on Feb. 24, 2022 in related Indian Application No. 202017005146.

Zhang, et al., "Hydrogen generation from pure water using Al—Sn powders consolidated through high-pressure torsion," Journal of Materials Research 31, 775-782 (2016).

"New process generates hydrogen from aluminum alloy to run engines, fuel cells" https://www.researchgate.net/publication/223479656_Aluminum_and_Aluminum_Alloys_as_Sources_of_Hydrogen_for_Fuel_Cell_Applications.

Soler et al. "Aluminum and Aluminum Alloys as Sources of Hydrogen for Fuel Cell Applications" Journal of Power Sources 169 (2007) 144-169.

Zhang et al. "Hydrogen generation from pure water using Al—Sn powders consolidated through high-pressure torsion" Journal of Materials Research vol. 31(6) Jun. 2017.

Abbas et al. "Hydrogen production using Al—Sn alloys prepared by rapid solidification" Journal of Advanced Physics vol. 13(6) Jun. 2017.

"Cryogenics" retrieved from Wikipedia on Sep. 14, 2018 and dated Jul. 13, 2016.

PCT Search Report dated Nov. 19, 2019.

Notice of Preliminary Rejection for related KR 10-2020-7005052 application from South Korean Patent Office dated Nov. 17, 2020 (machine translation in English also provided).

Patent Request Notification of Opinion Submission for related KR 10-2020-7005052 application from South Korean Patent Office dated Jun. 27, 2020 (machine translation in English also provided).

Communication from European Patent Office for related EP18838336 application dated Jun. 22, 2020.

Ma Kaka et al: "Mechanical behavior and strengthening mechanisms in ultrafine grain precipitation-strengthened aluminum alloy", Acta Materialia, Elsevier, Oxford, GB, vol. 62, Oct. 24, 2013 (Oct. 24, 2013), pp. 141-155.

Zhang Z et al: "Orientation of nanocrystals in rapidly solidified Al-based alloys and its correlation to the C22C compound-forming tendency of alloys", Journal of Crystal Growth, Elsevier, Amsterdam, NL, vol. 281, No. 2-4, Aug. 1, 2005 (Aug. 1, 2005), pp. 646-653.

Dryzek Jerzy et al: "Positron annihilation and tribological studies of nano-embedded Al alloys", Bulletin of Materials Science, Indian Academy of Sciences, IN, vol. 38, No. 5, Oct. 9, 2015 (Oct. 9, 2015), pp. 1141-1148.

"Hydrogen on Tap," AlGalCo, available at: https://sites.google.com/a/algalcoonline.com/algalco-hydrogen-on-tap/ (dated Sep. 2019).

International Preliminary Report on Patentability dated Sep. 10, 2019 (Sep. 10, 2019) for PCT/US2018/043267.

Communication from European Patent Office for related EP18838336 application dated Jul. 9, 2020.

Notice of Allowance for related KR Application No. 10-2020-7005052 from the Korean Patent Office dated Feb. 23, 2021 (machine translation in English also provided).

Allowed Claim Set for KR 10-2020-7005052 application (in English) (allowed by South Korean Patent Office on Feb. 23, 2021).

Certificate of Patent for related KR Application No. 10-2020-7005052 (Registration Date: May 20, 2021).

First Examination Report for related EP Application No. 18 838 336.8-1103 from the European Patent Office dated Apr. 23, 2021.

Guang, R et al., "Formation of nanocrystalline and amorphous phase of Al—Pb—Si—Sn—Cu powder during mechanical alloying", Materials Science and Engineering: A, Elsevier, Amsterdam, NL, vol. 416, No. 1-2, Jan. 25, 2006 (Jan. 25, 2006), pp. 45-50.

Office Action for related Chinese Application No. 01880054750.3 from the Chinese Patent Office dated May 20, 2021 (translation in English also provided).

"Powder Metallurgy: Principles and Applications" by F.V. Lenel; Metal powder Industries Federation, Princeton, New Jersey, 1980, pp. 59-72.

"Principles and Prevention of Corrosion" by Denny A. Jones, Second Edition, Prentice Hall, NJ, 1996, pp. 168-177.

"Advanced Inorganic Chemistry" by F. Albert Cotton, Geoffrey Wilkinson, Carlos A. Murillo and Manfred Bochmann, Sixth Edition, John Wiley & Son, Inc., New York, 1999, p. 1167.

Wikipedia entry for "Colloidal Gold," available at https://en.wikipedia.org/wiki/Colloidal_gold (accessed Jun. 13, 2021; page states "last updated on May 20, 2021").

David McNally, "Army discovery may offer new energy source," ARL Public Affairs (Jul. 25, 2017)—https://www.army.mil/article/191212/army_discovery_may_offer_new_energy_source.

David McNally, "Army scientists discover power in urine," ARL Public Affairs(Sep. 14, 2017)—https://www.army.mil/article/193647/army_scientists_discover_power_in_urine.

Jacqueline M. Hames, "New nanomaterial paves the way for green energy solutions," USAASC (Sep. 18, 2018)—https://www.army.mil/article/211271/new_nanomaterial_paves_the_way_for_green_energy_solutions.

"Army hydrogen-generation discovery may spur new industry," U.S. Army CCDC Army Research Laboratory (Jul. 16, 2019)—https://www.army.mil/article/224584/.

Tim Collins, "US military discovers a powder that can be used by soldiers to quickly charge up equipment on the frontline," The Daily Mail (Aug. 11, 2017)—http://www.dailymail.co.uk/sciencetech/article-4782204/US-Army-powder-generates-electricity-contact-water.html.

Jon Lockett, "Urine the Army Now: Military scientists develop state-of-the-art weapons and tanks fueled by soldiers' Pee," The Sun UK (Dec. 28, 2017)—https://www.thesun.co.uk/news/5152415/military-weapons-tanks-fuelled-soldiers-pee-maryland/.

Jacqueline M. Hames, "Just Add Water!" Army ALT Magazine, Science and Technology (Sep. 17, 2018)—https://asc.army.mil/web/news-alt-ond18-just-add-water/.

"Army discovery may offer new energy source," U.S. Army DEVCOM Army Research Laboratory (Jul. 21, 2017)—https://youtube.com/watch?v=0AE407SjFPM.

"Army discovers power in Urine," U.S. Army DEVCOM Army Research Laboratory (Sep. 11, 2017)—https://www. youtube.com/watch?v=BjV0qo6qz1l.

"Podcast: Power on Demand from Aluminum and Water," U.S. Army DEVCOM Army Research Laboratory (Jul. 8, 2019)—https://www.youtube.com/watch?v=N57mTOAScD8.

"GFS Innovators Corner #3: Instantaneous Hydrogen Generation for Soldier Power," U.S. Army Professional Forum (Apr. 3, 2018) https://www.youtube.com/watch?v=mqGeSAocNKU.

Federal Register, "Notice of Availability of Government-Owned Inventions; Available for Licensing," 83 FR 28625 (dated Jun. 20, 2018)—https://www.federalregister.gov/documents/2018/06/20/2018-13225/notice-of-availability-of-government-owned-inventions-available-for-licensing.

Federal Register, "Notice of Intent To Grant Exclusive Patent License to H2 Power, LLC; Chicago, IL," 83 FR 63633 (dated Dec.

(56)  References Cited

OTHER PUBLICATIONS 11, 2018)—https://www.federalregister.gov/documents/2018/12/11/
2018-26761/notice-of-intent-to-grant-exclusive-patent-license-to-h2-
power-llc-chicago-il.
"Aluminum Based Nanogalvanic Alloys for Hydrogen Generation,"
DEVCOM Army Research Laboratory, https://www.arl.army.mil/
business/intellectual-property/alnanogalvanicpowder/ (undated, but
believed to be created around Jun. 2018).
Office Action for related Japanese Patent Application No. 2020-
504403 (dated Aug. 23, 20221; dated Aug. 31, 2021).
Huihu Wang et al., "Investigation on hydrogen production using
multicomponent aluminum alloys at mild conditions and its mecha-
nism, International Journal of Hydrogen Energy", Elsevier, 2013,
02, 06, vol. 38, Issue 3, pp. 1236-1243, https://doi.org/10.1016/j.
ijhydene.2012.11.034.

\* cited by examiner

200

202 START

204 GENERATE WATER VAPOR

206 REACT WITH NANOGALVANAIC ALLOY

208 DESICCATE HYDROGEN

210 END

METHOD AND APPARATUS FOR USING NANOGALVANIC ALLOYS TO PRODUCE HYDROGEN

GOVERNMENT INTEREST

The invention described herein may be manufactured, used and licensed by or for the U.S. Government.

BACKGROUND

Field

Embodiments of the present invention generally relate to nanogalvanic alloys and, more specifically, to a method and apparatus for producing hydrogen using nanogalvanic alloys.

Description of the Related Art

Nanogalvanic alloys, especially aluminum-based nanogalvanic alloys, are characterized by their galvanic microstructure, which comprises an anodic matrix consisting of aluminum, an aluminum alloy, and a cathodic dispersed phase of another metal composition. These other metals may comprise, for example, but not limited to, tin, magnesium, silicon, bismuth, lead, gallium, indium, zinc, carbon, or a mixture of these metals. These alloys produce hydrogen gas when the cathodic disperse phase forms galvanic couples with the anodic matrix and the resulting galvanic metal microstructure comes in contact with water or any liquid containing water (aqueous solution). The nanostructured galvanic couple, with aluminum as the anode and the other metal element as the cathode, rapidly disturbs the formation of the native oxide layer and continually exposes fresh aluminum surfaces to hydrolysis.

The hydrogen produced by combining nanogalvanic alloys with liquid water may be coupled to a fuel cell to form a power supply to produce electrical energy. However, producing hydrogen from a combination of a nanogalvanic alloy and liquid water requires water to be readily available and, for portable systems, requires the water to be carried. As such, utilizing such a portable power supply requires carrying the weight of liquid water which limits the applications of such a power supply.

Therefore, there is a need in the art for a method and apparatus for using nanogalvanic alloys to produce hydrogen without using liquid water or liquids containing water.

SUMMARY

Embodiments of the present invention include a method and apparatus for using nanogalvanic alloys to produce hydrogen without using liquid water or liquids containing water in accordance with the following description and drawings.

BRIEF DESCRIPTION OF THE DRAWINGS

So that the manner in which the above recited embodiment of the present invention can be understood in detail, a more particular description of the invention, briefly summarized above, may be had by reference to various embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
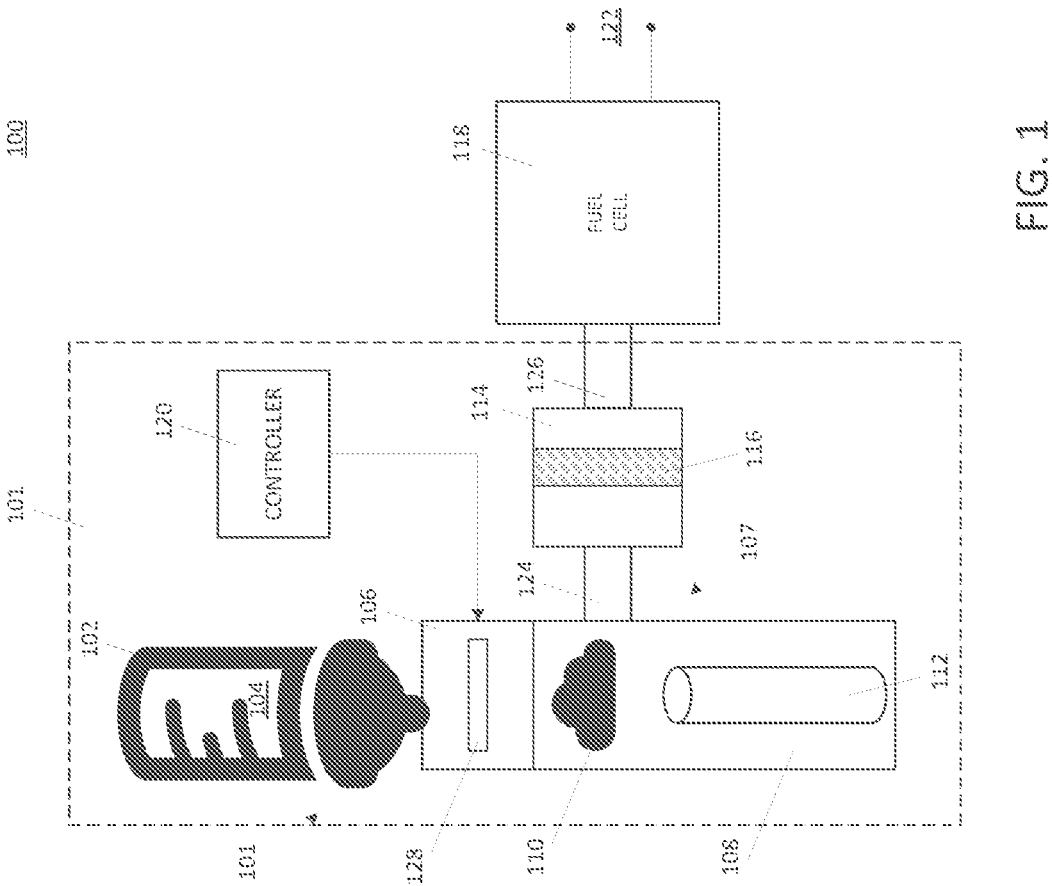
FIG. 1 depicts a schematic, block diagram of apparatus for using nanogalvanic alloys to produce hydrogen using water vapor in accordance with an embodiment of the present invention.

Embodiments of the present invention include a method and apparatus using nanogalvanic alloys to produce hydrogen using water vapor. In one embodiment, a nanogalvanic alloy is exposed to water vapor having a humidity level high enough to cause a galvanic reaction between the water vapor and the alloy to produce hydrogen. The water vapor may be available from atmospheric conditions or may be engineered water vapor.

The production of aluminum-based nanogalvanic alloys for use in generating hydrogen is described in commonly assigned US patent publication number 2020/0024689, filed 23 Jul. 2018, entitled "Aluminum Based Nanogalvanic Compositions Useful for Generating Hydrogen Gas and Low Temperature Processing Thereof," (referred to herein as the '689 patent publication) which is hereby incorporated herein by reference in its entirety. The '689 patent publication describes alloys comprised of a refined microstructure, ultrafine or nano scaled, that when reacted with water or any liquid containing water will spontaneously and rapidly produce hydrogen gas at ambient or elevated temperature. These metals, termed here as aluminum based nanogalvanic alloys have applications that include, but are not limited to, energy generation on demand. The alloys may be composed of primarily aluminum and other metals, e.g., tin bismuth, indium, gallium, lead, etc. and/or carbon, and mixtures and alloys thereof. The alloys may be processed by ball milling for the purpose of synthesizing powder feed stocks, in which each powder particle will have the above-mentioned characteristics. These powders can be used in their inherent form or consolidated using commercially available techniques for the purpose of manufacturing useful functional components as well as cylindrical or rectangular bars.

Embodiments of the present invention pertain to the utilization of nanogalvanic aluminum based alloys in powder or consolidated form for spontaneous, facile generation of hydrogen, by reacting the alloy with natural or engineered atmospheric humidity. Atmospheric humidity is a measure of the amount of water vapor or moisture in the air. This includes heated steam, i.e., the vapor into which water is converted when heated, forming a white mist of minute water droplets in the air or undercooled vapor such as fog, mist, haze, i.e., a visible mass of condensed water vapor suspended in the atmosphere which may or may not be heated, or some mixture of water vapor with another chemically distinct form of vapor or other phase. Engineered atmospheric humidity specifies the use of, but not limited to: mechanical, thermal, acoustic, ultrasonic, photonics, electromagnetic radiation, radiation and magnetic energy to form suspended water vapor. Suspended refers to being airborne for some undefined amount of time.

In an exemplary embodiment described with reference to FIG. 1 below, engineered water vapor is created using a commercially available ultrasonic vaporizer to supply a sustained water vapor to a nanogalvanic alloy for continuous and controlled hydrogen production for use with a permeable electron membrane (PEM) fuel cell or similar device. As such, a light-weight, compact electrical power supply is created.

FIG. 1 depicts a schematic diagram of energy producing apparatus 100 that uses nanogalvanic alloys to produce hydrogen gas from water vapor in accordance with an embodiment of the present invention. The apparatus 100 comprises a hydrogen gas producing assembly 101 and power generator 103. The hydrogen gas producing assembly 101 comprises a water vapor source 105 and a reaction assembly 107.

In one exemplary embodiment, the water vapor source 105 comprises a water or aqueous solution source 102, e.g., conduit (water pipe), bottle, bladder, etc. for supplying water or other aqueous solution 104 to a vapor producing device 106. The vapor producing device 106 may utilize, but is not limited to, mechanical, thermal, acoustic, ultrasonic, photonics, electromagnetic radiation, radiation and magnetic energy to form suspended water vapor. FIG. 1 depicts the use of, for example, an ultrasonic vaporizer 128 comprising a piezoelectric transducer (not shown) that vibrates at about 1-2 MHz to vaporize water 104 that contacts the transducer. A controller 120 applies power to the device 106 to control activation. The controller 120 may modulate activation of the device 106 to ensure a specific water vapor pressure is maintained as the alloy is hydrolyzed by the reaction, e.g., less than 45 psi. In other embodiments, other devices 106 may be used to generate water vapor 110 within the reaction assembly 107.

In other embodiments, the water vapor source may be atmospheric water vapor, i.e., humid air, that is channeled into the reaction assembly 107. In one embodiment, humidity of the atmospheric water vapor need only be 60% or more to contain sufficient water vapor to create and maintain a hydrolysis reaction with nanogalvanic alloy to produce hydrogen.

The reaction assembly 107 comprises a reaction chamber 108, hydrogen gas conduits 124 and 126, and a desiccant chamber 114 containing a desiccant 116. In one embodiment, the reaction chamber 108 contains at least one bar 112 of aluminum-based nanogalvanic alloy. The manufacture of which is described in detail in the '689 patent publication. In one embodiment, the bar contains nanogalvanic aluminum 5056 and 3% bismuth powder that is pressed into a cylinder-shaped bar 112. In other embodiments, the bar may be formed in other shapes, e.g., rectangular, square, star, octagon, etc.) or the alloy may be placed in the chamber 108 in powder form. Within the chamber 108, the bar 112 is exposed to water vapor 110 to produce hydrogen to achieve a pressure at the coupler 124 of, for example, about 7 psi. In one embodiment, the bar 112 is positioned with its long axis in the vertical direction. This orientation allows the hydrolyzed alloy to drop from the bar's surface and expose "fresh" alloy beneath the surface. In some embodiments, a plurality of bars are arranged in the chamber 108. In other embodiments, a plurality of chambers 108, each containing at least one bar 112, may be arranged in an array.

Hydrogen gas produced by the reaction exits the chamber 108 through coupling 124 (i.e., a gas conduit) and passes through a desiccant chamber 114 to remove water from the hydrogen gas. The desiccant chamber 114 comprises a desiccant 116 for removing water from a gas. In one embodiment, the desiccant 116 is a block, bar, or sheet of aluminum based nanogalvanic alloy. By using the alloy as a desiccant, water is removed from the hydrogen gas and additional hydrogen is released into the chamber 114. In other embodiments, other desiccants may be used such as, but not limited to, silica gels, molecular sieve, sorbent and the like. The dried hydrogen gas flows from the chamber 114 through coupling 126 (i.e., a gas conduit) to a power generator 103, such as a PEM fuel cell 118. The hydrogen producing assembly 101 produces, for example, a continuous 7 psi flow of hydrogen gas into the fuel cell 118. As such, the fuel cell produces electricity at terminals 122. In one embodiment, with a 7 psi source of hydrogen, the fuel cell may produce approximately 10 Watts of DC power at a nominal 6 volts. In other embodiments, the power generator 103 may be any form of power conversion device including, but not limited to, an internal combustion engine adapted to combust hydrogen. In other embodiments, the hydrogen gas may be coupled from the conduit 126 and stored in a hydrogen gas storage device (not shown), e.g., gas bottle, tank or solid-state hydrogen storage system (metal hydride).

Figure 2:
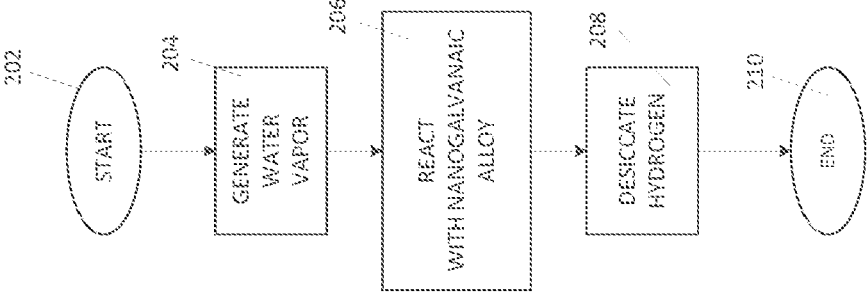
FIG. 2 depicts a flow diagram of a method of operation for the apparatus of FIG. 1 in accordance with an embodiment of the present invention.

FIG. 2 depicts a flow diagram of a method 200 of operation for the apparatus of FIG. 1 in accordance with an embodiment of the present invention. The method 200 begins at 202 and proceeds to 204 where the method generates water vapor within the reaction chamber. As described above, the water vapor may be generated by many types of devices or using atmospheric water vapor that is channeled into the reaction chamber.

At 206, the water vapor reacts with the bar of nanogalvanic alloy to produce hydrogen gas. At 208, the water vapor is removed from the hydrogen gas by passing the hydrogen gas through a desiccant material. In one embodiment, the desiccant is a bar, block, sheet, etc. of aluminum based nanogalvanic alloy which operates to remove water vapor as well as produce additional hydrogen gas. In other embodiments, other desiccants may be used such as, but not limited to, silica gels, molecular sieve, sorbent. The method 200 ends at 210. The hydrogen gas produced using method 200 may be used for industrial purposes, e.g., stored, or may be used for fuel by coupling the gas to a fuel cell or other energy conversion device, e.g., internal combustion engine.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g., A, AB, AC, ABC, ABB, etc.). When "and/or" is used, it should be understood that the elements may be joined in the alternative or conjunctive.

While the foregoing is directed to embodiments of the present invention, other and further embodiments of the invention may be devised without departing from the basic scope thereof, and the scope thereof is determined by the claims that follow.

The invention claimed is:

1. A method of generating hydrogen gas comprising:
supplying water vapor;
reacting water vapor with a nanogalvanic alloy to generate hydrogen gas further comprising removing water vapor from the hydrogen gas,

wherein removing water vapor is performed by a desiccant comprising a nanogalvanic alloy.

2. The method of claim 1 wherein the nanogalvanic alloy of the desiccant comprises a powder containing substantially aluminum and at least one of tin, bismuth, indium, gallium, lead or carbon, and mixtures and alloys thereof.

3. The method of claim 1 wherein the nanogalvanic alloy comprises a powder containing substantially aluminum and at least one of tin, bismuth, indium, gallium, lead or carbon, and mixtures and alloys thereof.

4. The method of claim 1 wherein hydrogen gas is produced at about 7 PSI.

5. The method of claim 1 wherein supplying water vapor uses mechanical, thermal, acoustic, ultrasonic, photonics, electromagnetic radiation, radiation and magnetic energy to form suspended water vapor.

6. The method of claim 1 wherein supplying water vapor comprises supplying atmospheric water vapor.

7. The method of claim 1 wherein the nanogalvanic alloy comprises at least one bar formed of nanogalvanic alloy powder.

* * * * *